United States Patent
Berkey et al.

(10) Patent No.: US 7,849,203 B2
(45) Date of Patent: Dec. 7, 2010

(54) COMMAND AND CONTROL OF ARBITRARY RESOURCES IN A PEER-TO-PEER NETWORK

(75) Inventors: Howard Berkey, Foster City, CA (US); Greg Corson, San Mateo, CA (US); John Paul Bates, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1334 days.

(21) Appl. No.: 10/845,508

(22) Filed: May 12, 2004

(65) Prior Publication Data

US 2004/0249888 A1    Dec. 9, 2004

Related U.S. Application Data

(60) Provisional application No. 60/476,084, filed on Jun. 4, 2003.

(51) Int. Cl.
*G06F 15/16* (2006.01)
(52) U.S. Cl. .................. 709/229; 709/204
(58) Field of Classification Search .......... 709/229, 709/204
See application file for complete search history.

(56) References Cited

U.S. PATENT DOCUMENTS 6,671,284 B1 * 12/2003 Yonge et al. ............... 370/462
6,981,047 B2 * 12/2005 Hanson et al. ............. 709/227
7,275,102 B2 *  9/2007 Yeager et al. .............. 709/224
2003/0154306 A1 *  8/2003 Perry ........................ 709/245
2004/0148434 A1 *  7/2004 Matsubara et al. ......... 709/246

FOREIGN PATENT DOCUMENTS

WO    WO 01/86423 A2    11/2001

OTHER PUBLICATIONS

Unknown, "*Jini Architectural Overview*" Technical White Paper, XP-002217546, pp. 1-3, 7-10, 15, 1999, Sun Microsystems.
Hessing, "*Peer to Peer Messaging Protocol (PPMP)*", Apr. 2002, © The Internet Society, XP015001173.
Li et al., "*Research of Peer-to-Peer Network Architecture*", pp. 312-315, Proceedings of ICCT2003, vol. 1, Apr. 9, 2003, XP010643597, Nat'l High Tech. Dev. 863 Program of China, 2001-AA-11-1-141.

(Continued)

*Primary Examiner*—George C Neurauter, Jr.
*Assistant Examiner*—Mark D Fearer
(74) *Attorney, Agent, or Firm*—Martine Penilla & Gencarella, LLP

(57) ABSTRACT

Provided is a method and apparatus for virtualizing access to resources in a distributed peer-to-peer (P2P) network. Specifically, a resource locally managed by a peer in the P2P network can be published such that other peers can identify the peer managing the resource. Any peer requesting access to the resource of another peer establishes communication to the peer managing the resource. After establishing communication, a proxy of the peer managing the resource can establish a proxy interface. The proxy interface operating on the peer requesting access, permits the peer requesting access to generate command and control data to control the resource. Thus, the peer requesting access believes that it manages the local resource, while in reality, the peer requesting access only has virtualized access to the resource.

16 Claims, 10 Drawing Sheets

OTHER PUBLICATIONS

Boggs, Jr., "*Bit-String Resource Allocation Mechanism*", pp. 1667-1669, XP-002299945, NN 76101667, IBM Tech. Disclosure Bulletin, vol. 19, No. 5, Oct. 1, 1976, New York.

Hsiao et al., "*A Tree Model for Structured Peer-to-Peer Protocols*", pp. 336-343, 3$^{rd}$ IEEE/ACM Int'l Symp. on Cluster Computing and the Grid (CCGRID'03), May 12, 2003, XP010639769, IEEE, Dept. of Computer Science, Taiwan.

Hsiao et al., "*Tornado: A Capability Aware Peer-to-Peer Storage Network*", Apr. 22, 2003, pp. 72-79, XP010645600, IEEE Computer Society.

Rhea et al., "*Probabilistic Location and Routing*", pp. 1248-1257, vol. 1 of 3, XP010593691, conf. 21, (Jun. 23, 2002), IEEE Infocom 2002, Conf. On Communications Jun. 23-27, 2002, New York.

\* cited by examiner

COMMAND AND CONTROL OF ARBITRARY RESOURCES IN A PEER-TO-PEER NETWORK

CROSS REFERENCE TO RELATED APPLICATIONS

This application claims priority under 35 U.S.C. §119(e) to U.S. Provisional Patent Application No. 60/476,084, filed on Jun. 4, 2003 and entitled "Virtual/Real World Dynamic Intercommunication Methods and Systems," which is hereby incorporated by reference in its entirety.

BACKGROUND

1. Field of the Invention

The present invention relates to peer-to-peer networks, and more specifically to manipulating arbitrary resources of peers in the peer-to-peer network.

2. Description of the Related Art

Currently, a client can access resources through a server over a network. For example, FIG. 1 is a prior art diagram illustrating a client 140 accessing resources over a network 130. A server 110 interfaced by a proxy server 120 provides access to multiple resources of the server 110. The resources can include a central processing unit (CPU) 112, a memory 114, a disk 116, and a printer 118. Typically, the client 140 requests access to a resource, such as the printer 118 and the proxy server 120 either grants or disallows access. When granting access, the proxy server 120 permits the transmission of the request to the server 110. An exemplary request is printing a document transmitted from the client 140 to the server 110.

In a Common Object Request Broker Architecture (CORBA), a repository of objects operating on the proxy server 120 can provide access to the resources on the server 110. Thus, although it appears that the client 140 is accessing the physical resource, such as the disk 116, the client 140 is only provided a virtualized interface to a pseudo-device driver managing access to the device 116. Consequently, when the client 140 requires access to resources on the server 110, the client 140 accesses a physical proxy server 120 or communicates with middleware, such as CORBA. In each access method, the client 140 is only given virtualized access to the resource, instead of full control of the resource.

Accordingly, what is needed is a method and an apparatus for enabling access to resources, while bypassing the need for a proxy server or pseudo-device drivers.

SUMMARY OF THE INVENTION

Broadly speaking, the present invention is a method and apparatus for virtualizing access to distributed resources in a peer-to-peer network. It should be appreciated that the present invention can be implemented in numerous ways, such as a process, an apparatus, a system, a device or a method on a computer readable medium. Several inventive embodiments of the present invention are described below.

In one embodiment, a method for peers of a peer-to-peer network to access resources connected to particular peers of the peer-to-peer network includes establishing communication between a first peer and a second peer in the peer-to-peer network. The method also includes defining parameters for accessing a resource of the first peer, such that the first peer provides a proxy for managing access to the resource. Further, the method includes enabling access to the resource from the second peer through the proxy, such that the proxy defines a proxy interface to enable the second peer to interact with the resource.

In an embodiment of a system for providing access to resources in a peer-to-peer distributed network, the system can include a first system and a second system that are capable of communication with one another. The system also includes a publication list that is accessible by the first system to identify the second system. Further, the system includes a resource of the second system that is capable of being accessed by a proxy interface of the first system, such that manipulation of the resource is processed through the proxy interface.

An embodiment of a peer-to-peer grid includes a first peer and a second peer connected together, such that the first peer is capable of requesting a resource connected to the second peer. Further, a proxy service can operate on the second peer, such that the proxy service is capable of granting access to the resource. The proxy interface can operate on the first peer, such that the proxy interface is capable of providing command and control signals to the resource using a local system operating on the first peer.

In an embodiment of a computer program embodied on a computer readable medium for accessing resources in a peer-to-peer network, the computer program includes instructions for defining parameters for accessing a resource of a first peer connected to the peer-to-peer network, such that the first peer provides a proxy for managing access to the resource. The computer program also includes instructions for enabling access to the resource from a second peer connected to the peer-to-peer network through the proxy, such that the proxy defines a proxy interface to enable the second peer to interact with the resource.

An embodiment of a peer-to-peer network includes means for establishing communication between a first peer and a second peer in the peer-to-peer network and means for defining parameters for accessing a resource of the first peer. The first peer provides a proxy for managing access to the resource. Further, the peer-to-peer network includes means for enabling access to the resource from the second peer through the proxy, such that the proxy defines a proxy interface to enable the second peer to interact with the resource.

Other aspects of the invention will become apparent from the following detailed description, taken in conjunction with the accompanying drawings, illustrating by way of example the principles of the invention.

BRIEF DESCRIPTION OF THE DRAWINGS

Embodiments of the invention may best be understood by reference to the following description taken in conjunction with the accompanying drawings in which.

DETAILED DESCRIPTION

The following embodiments describe a method and apparatus for providing proxied access to arbitrary resources in a peer-to-peer (P2P) network. Arbitrary resources can include any physical component of a peer that is connected to the P2P network. Exemplary physical components can include processors, storage devices, radio receivers, radio telescopes, image capture devices such as cameras, printers, display devices, security devices, and media-specific devices such as digital video disc (DVD) drives and CD drives. Thus, any physical component is possible, as long as a first peer connected to the P2P network can take command and control of the physical component of a second peer in the P2P network. It will be obvious, however, to one skilled in the art, that the present invention may be practiced without some or all of these specific details. In other instances, well known process operations have not been described in detail in order not to unnecessarily obscure the present invention.

Peer-to-peer networks are decentralized computing systems such that each peer has equivalent capabilities with any other peer. In some exemplary embodiments, a peer can include any computing device, such as a desktop-class computer, a server-class computer, a mobile device, a game machine, and a game console. However, in other embodiments, the peer can be a computing device that is capable of establishing communication with another computing device, as long as the computing devices are connected to the P2P network.

Figure 1:
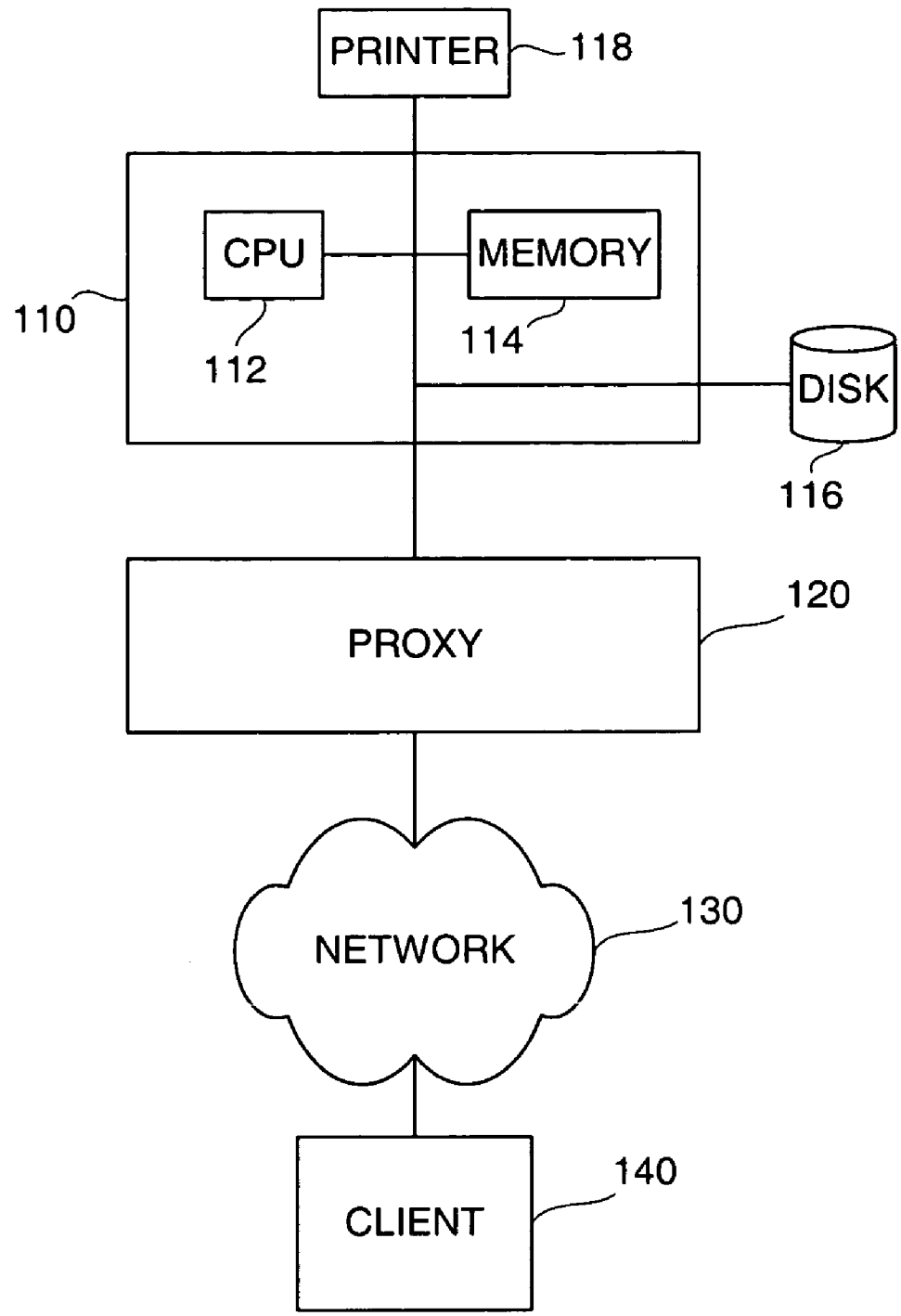
FIG. 1 is a prior art diagram illustrating a client accessing resources over a network.
Figure 2A:
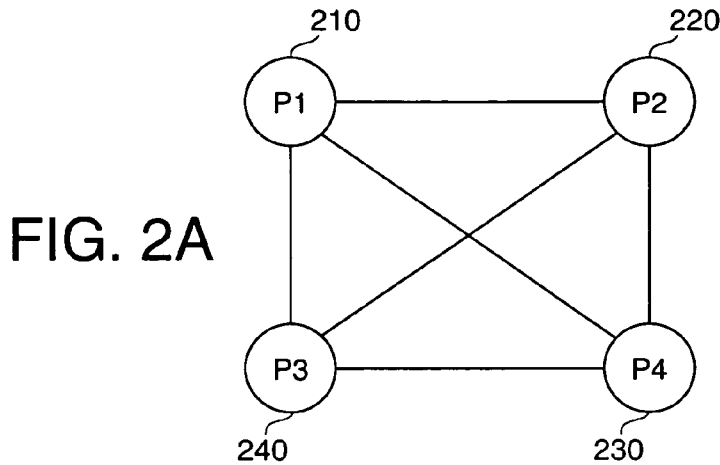
FIG. 2A is a diagram illustrating a fully connected peer-to-peer network, in accordance with an embodiment of the invention.

In contrast with centralized computing systems, such as client/server environments, any peer in the P2P network can interact directly with any other peer in the P2P network. Thus, in the P2P network, a first peer is not a "server" for a second peer that is a "client" for applications and devices located on the server. Moreover, P2P networks can have many configurations. For example, FIG. 2A is a diagram illustrating a fully connected peer-to-peer network, in accordance with an embodiment of the invention. In the fully connected P2P network, a first peer 210, a second peer 220, a third peer 240, and a fourth peer 230 can communicate directly with one another because each peer has a connection to every other peer. In one exemplary embodiment, a resource of the first peer 210, such as a DVD recorder, can be accessed by the second peer 220, the third peer 240, and the fourth peer 230.

For example, when the fourth peer 230 accesses the DVD recorder of the first peer 210, the first peer 210 interfaces with the fourth peer 230 to provide command and control of the DVD recorder to the fourth peer 230. The interface can be any type of graphics interface. Exemplary embodiments can include a web browser, a terminal screen, and a graphics user interface (GUI). To one of ordinary skill in the art, the interface can be any mechanism that permits the fourth peer 230 to take command and control of the DVD recorder of the first peer 210, as long as the peers are connected in the P2P network.

Figure 2B:
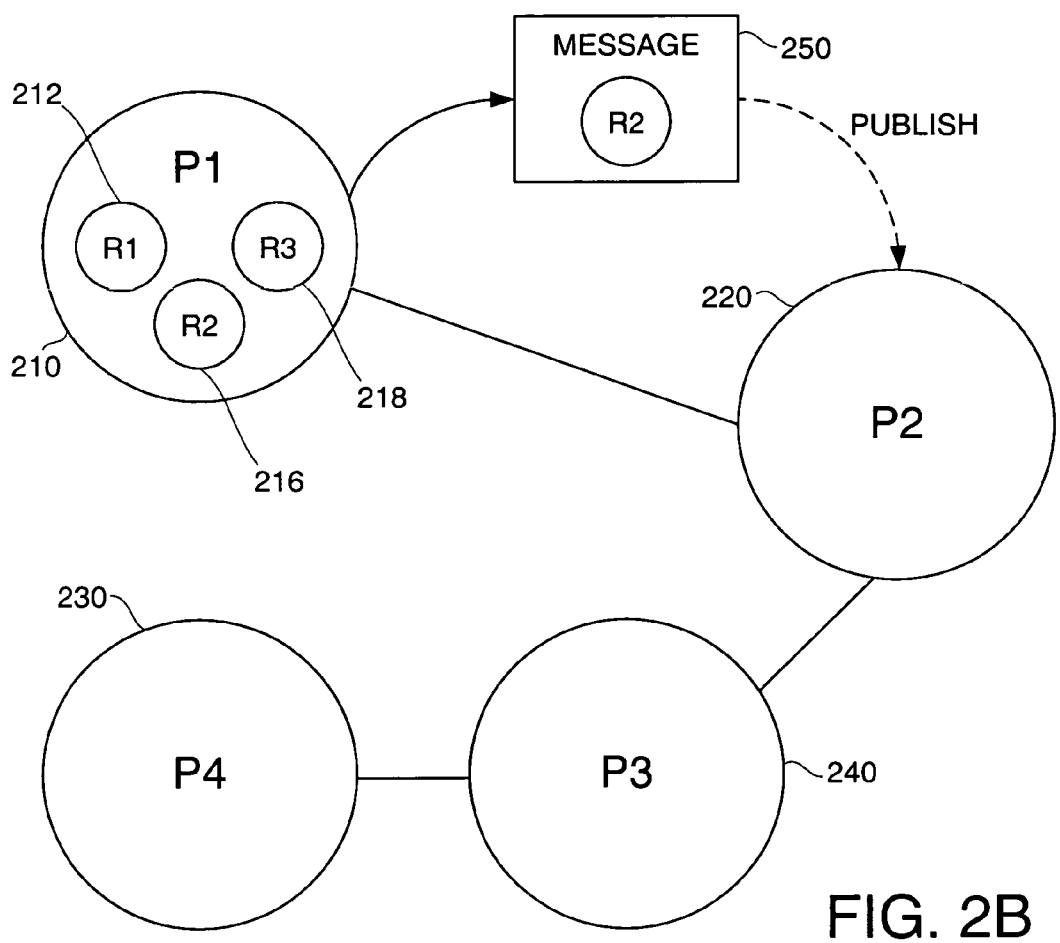
FIG. 2B is a diagram illustrating a peer publishing resources in a peer-to-peer network, in accordance with an embodiment of the invention.

In order to access the resource of the first peer 210, the first peer publishes the resource on the P2P network with some or all of the other peers. For example, FIG. 2B is a diagram illustrating a peer publishing resources in a peer-to-peer network, in accordance with an embodiment of the invention. The peers in the fully connected P2P network can be connected serially. In one embodiment of a non-fully connected P2P network, the first peer 210 can connect to the second peer 220. The second peer 220 can then connect to the third peer 240. Correspondingly, the third peer 240 connects to the fourth peer 230. The first peer 210 can manage three resources, such as a first resource 212, a second resource 216, and a third resource 218. Further, the peers can have any number of resources and can also be connected in any network configuration, as long as the peers can communicate with one another in a P2P network.

To identify the resources of a particular peer, such as the first peer 210, the first peer can publish the resource. In one exemplary embodiment, the first peer 210 can publish the second resource 216 on the P2P network. Specifically, the first peer 210 can transmit a message 250 to publish the second resource to the second peer 220. After publication, any peer on the P2P network, such as the third peer 240 and the fourth peer 230, can access the second resource 216 by identifying the peer that manages the second resource 216. Because the first peer 210 published the second resource 216 to the second peer 220, the second peer 220 can identify the first peer 210 as managing the second resource 216. Subsequently, the third peer 240 and the fourth peer 230 only need to send a request for the second resource 216 to the peers on the P2P network to find out which peer manages the second resource 216.

Figure 2C:
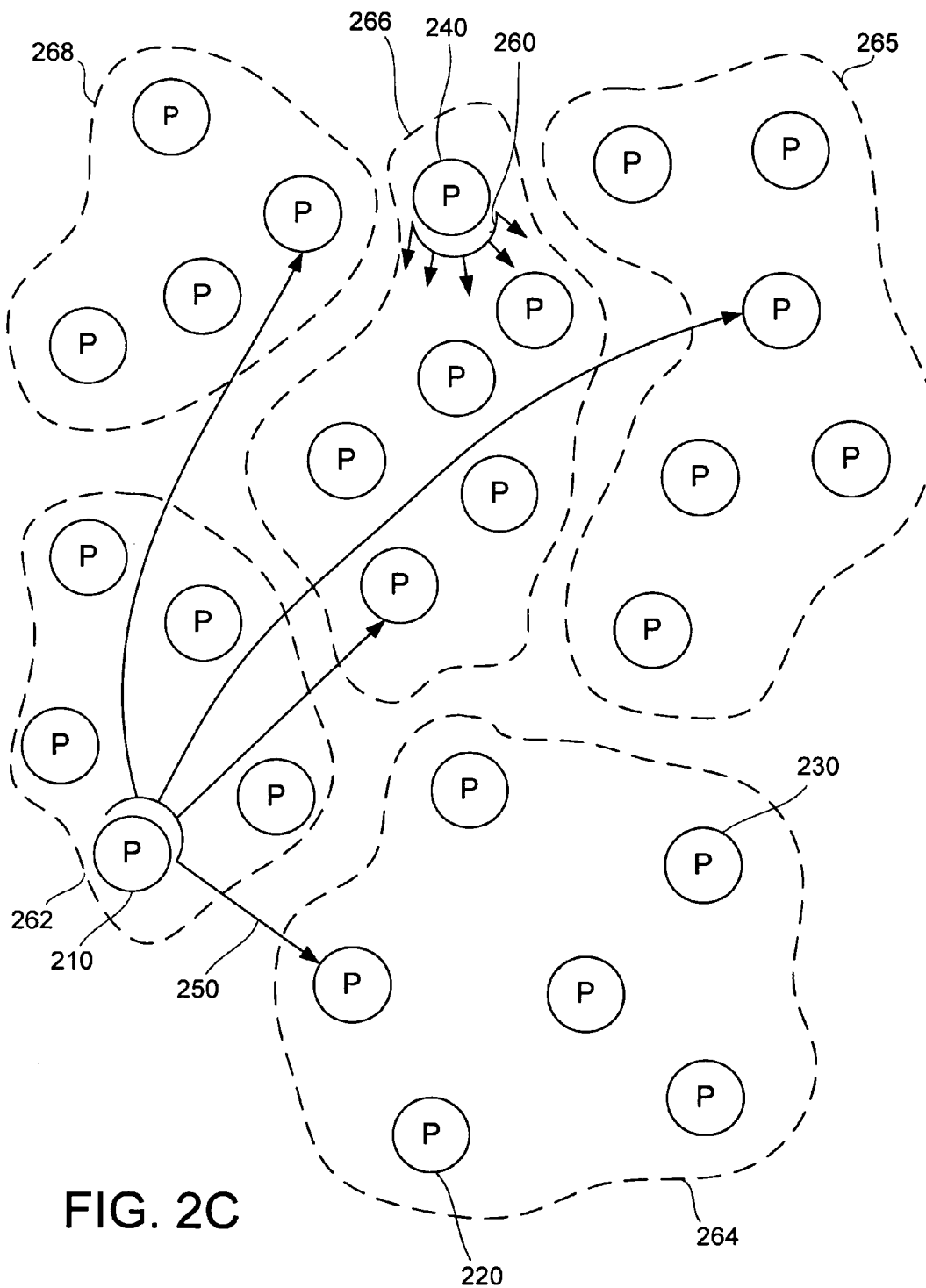
FIG. 2C is a diagram illustrating publishing and requesting resources between zones in a peer-to-peer network, in accordance with an embodiment of the invention.

Although FIG. 2B is an example of one peer publishing a resource to an adjacent peer, another embodiment can include another publishing method. FIG. 2C is a diagram illustrating publishing and requesting resources between zones in a peer-to-peer network, in accordance with an embodiment of the invention. A first zone 262, a second zone 264, a third zone 265, a fourth zone 266, and a fifth zone 268 can represent different local areas containing peers. Each peer can connect to one another and each zone can connect to one another. As illustrated in FIG. 2C, the first zone 262 can contain the first peer 210. The second zone 264 can contain the second peer 220 and the fourth peer 230. The fourth zone 266 can contain the third peer 240. In one exemplary embodiment, the first peer 210 can publish resources to multiple peers in other zones using multiple messages 250. After publication, if the third peer 240 desires access to a resource managed by the first peer 210, then the third peer 240 can transmit a message request 260 to other peers in the fourth zone 266. If a peer in the fourth zone 266 cannot identify the peer managing the resource requested by the third peer 240, then the message request 260 can propagate to another zone. Eventually, a peer in the P2P network from any of the zones can identify the peer managing the requested resource.

In other embodiments, the first peer 210 can publish to all the peers in all the zones. Regardless of the publication method, any P2P network having any configuration can identify peers managing requested resources, as long as one peer publishes the requested resource and another peer transmits the message request to find the requested resource. However, in the fully connected P2P network illustrated in FIG. 2A, there would be no need to publish resources because any requested resource by one peer is only one connection away from another peer. Thus, while some embodiments publish resources, other embodiments obviate the need for publication.

Figure 2D:
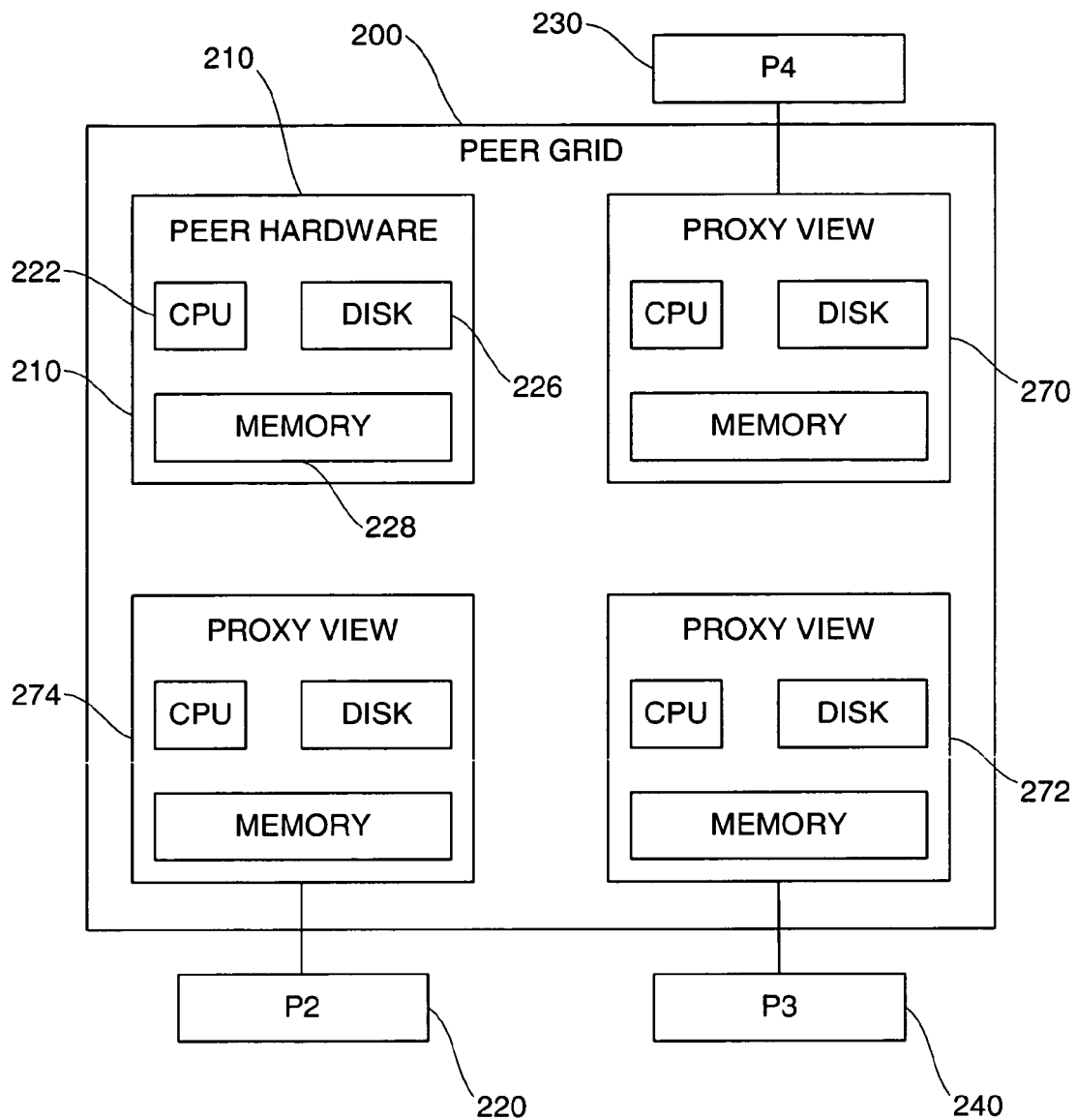
FIG. 2D is a diagram illustrating a peer providing proxy services to other peers in a peer-to-peer network, in accordance with an embodiment of the invention.

After publishing a resource on the P2P network, any peer on the P2P network can request proxied access to the resource. To provide proxied access to the resource, a peer managing the resource provides proxy services to the peer requesting the resource. For example, FIG. 2D is a diagram illustrating a peer providing proxy services to other peers in a peer-to-peer network, in accordance with an embodiment of the invention. The first peer 210 can be configured to provide a plurality of proxy services to manipulate a resource managed by the first peer 210. The proxy services mediate all access to the resource by mapping virtual access from peers on the P2P network to the local physical resource. A peer grid 200 is an example of the first peer 210 providing proxy services to multiple peers. The proxy services can enable proxy interfaces on the peer requesting the resource from the first peer 210.

For example, the first peer 210 can manage resources, such as a central processing unit (CPU) 222, a disk 226, and a memory 228. Each resource is a physical component that is represented by a first proxy view 270, a second proxy view 272, and a third proxy view 274. When the second peer 220, the third peer 240, and the fourth peer 230 requests the resources managed by the first peer 210, the corresponding proxy views can provide access to the resources. Specifically, if the third proxy 240 desires access to the disk 226, then the third proxy 240 accesses the disk 226 via the second proxy view 272.

Accordingly, because the peer managing resources can provide proxy services, the peers requesting access to the resources can interface with the peer managing the resources through multiple proxy views. In other exemplary embodiments, other interfaces and methods of accessing resources managed by a peer are possible, as long as the peer managing the resources provides proxy services to peers requesting access to the resources.

Figure 3:
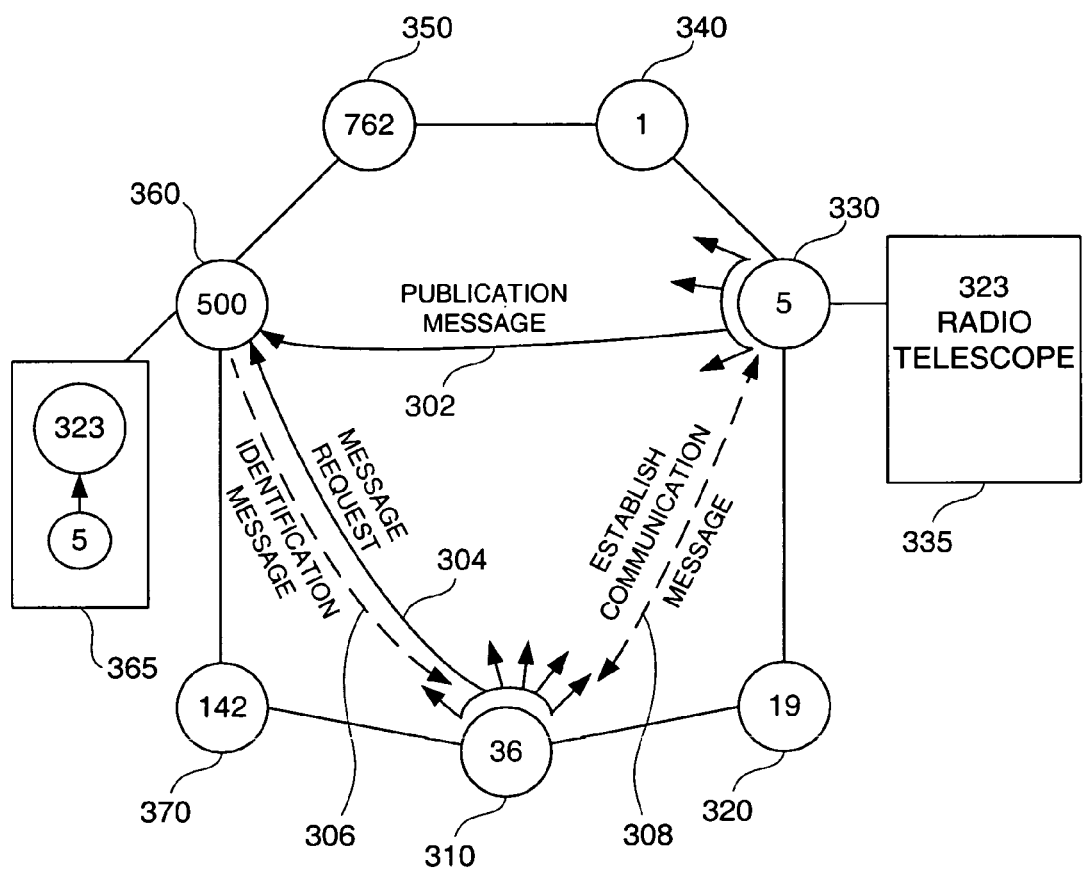
FIG. 3 is a diagram illustrating communication between peers in a peer-to-peer network, in accordance with an embodiment of the invention.

FIG. 3 is a diagram illustrating communication between peers in a peer-to-peer network, in accordance with an embodiment of the invention. An exemplary P2P network can include a peer-36 310, a peer-19 320, a peer-5 330, a peer-1 340, a peer-762 350, a peer-500 360, and a peer-142 370 connected in a ring. Each peer can manage any number of resources and each peer can list available resources of other peers. In the exemplary embodiment of FIG. 3, a peer-5 330 can manage a resource, such as a radio telescope 335. The resource has an identifier 323. In other embodiments, any identification scheme for resources is possible, as long as the identification scheme can uniquely identify the resource.

Further, a peer-500 can manage a resource list 365, identifying all the peers managing resources in the P2P network. To publish the identifier 323, the peer-5 330 can transmit a publication message 302 to all the peers in the P2P network. Alternatively, the peer-5 330 can target selected peers for publishing the radio telescope 335. For example, the peer-5 330 can transmit the publication message 302 directly to the peer-500 360. Upon receiving the publication message 302, the peer-500 360 identifies that the peer-5 330 manages the radio telescope 335 via the identifier 323. Subsequently, any peer on the P2P network can identify the location of the radio telescope 335 by transmitting message requests to the peer-500 360.

For an exemplary resource request, the peer-36 310 can transmit a message request 304 to the peer-500 360 to find the location of the radio telescope 335. Alternatively, the peer-36 310 can transmit multiple message requests 304 to other peers in the P2P network. When the peer-500 360 receives the message request 304, the peer-500 360 examines the resource list 365 to determine the location of the peer managing the requested resource. If the resource has been published, such as the radio telescope 335, then the peer-500 360 transmits an identification message 306 to the peer-36 310. The peer-36 310 then transmits an establish communication message 308 to the peer-5 330 to request access to the radio telescope 335.

In other embodiments, any sequence of messages can be transmitted to request access to a resource. For example, the peer-36 310 may have the resource list 365, thus obviating the need to transmit the message request 304 and receiving the identification message 306. Thus, any method of locating a resource is possible, as long as the peer requesting the resource can establish communication with the peer managing the requested resource.

Figure 4A:
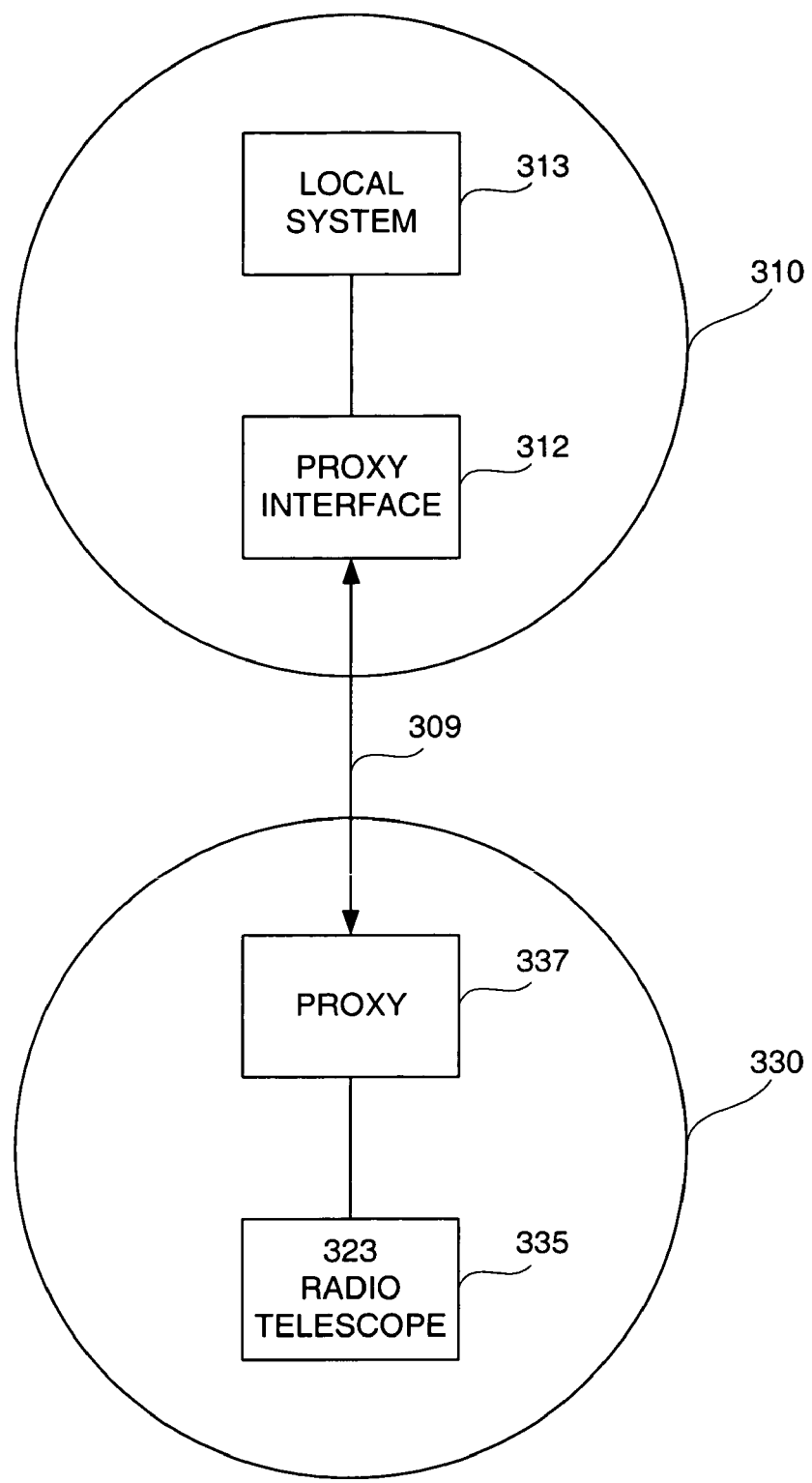
FIG. 4A is a diagram illustrating established communication between peers in a peer-to-peer network, in accordance with an embodiment of the invention.

After transmitting the establish communication message 308, the peer-5 330 determines whether to grant the request for proxied access to the radio telescope 335. If the peer-5 330 grants proxied access to the radio telescope 335, then the peer-5 330 provides proxy services. Accordingly, FIG. 4A is a diagram illustrating established communication between peers in a peer-to-peer network, in accordance with an embodiment of the invention. The peer-36 310 can communicate with the peer-5 330 over a bi-directional communication link 309. One of ordinary skill in the art will recognize that the bi-directional communication link 309 can be any wire-based or wireless medium fostering bi-directional communication between peers.

The peer-5 330 manages the radio telescope 335 for access by any peer in the P2P network. Thus, to provide access to any peer on the P2P network, the peer-5 330 uses a proxy 337 to provide proxy services. Proxy services can include assessing and gathering constraints of the resource, such as determining whether a peer can be permitted to access the resource and if permitted, then the duration of access. To accomplish the assessment, the physical component, such as the radio telescope 335, communicates access information to the proxy 337.

Further, proxy services provided by the proxy 337 can include providing a proxy interface 312 on the peer-36 310. The proxy interface 312 can interface with one of the proxy views illustrated in FIG. 2D via a graphics interface. The graphics interface can by any mechanism to manipulate the resource on the peer-36 310, as long as the graphics interface provides the capability to manipulate the resource.

By using the proxy views in the peer grid 200, the peer-5 330 can arbitrate multiple accesses to the resource from multiple peers. Consequently, by managing the proxy views, the peer-5 330 can determine an order for accessing the resource. For example, the peer-5 330 can use a first-come-first served (FCFS) order or can use a priority-based order where a peer with a higher priority can access the resource first. Of course, a combination of FCFS and priority-based order is possible, along with any ordering paradigm, as long as the peer managing the resource can control multiple accesses to the resource.

The proxy 337 establishes the proxy interface 312 on the peer requesting the resource. For example, the peer-36 310 can use the proxy interface 312 to provide command and control data generated by a local system 313 to manipulate the radio telescope 335. The local system 313 will be recognized by one of ordinary skill in the art as any type of operating system (OS). Examples of currently available operating systems include Solaris®, any version of MS-Windows®, and any OS version of Unix®, etc. Thus, any other proprietary and non-proprietary OS is possible, as long as the OS can generate command and control data to manipulate the resource. The command and control data permits the peer-36 310 to control the radio telescope 335 and propagate via signals on the bi-directional communication link 309 from the peer-36 310 to the peer-5 330.

Upon receiving the command and control data, the proxy 337 permits control of the radio telescope 335, limited by the constraints imposed on the peer-36 310. For example, the peer-36 310 may be limited to accessing the radio telescope 335 during periods of inactivity. Thus, because of the proxy interface 312, from the viewpoint of the peer-36 310, the radio telescope 335 is a resource local to the peer-36 310. Accordingly, every proxy interface 312 generated on a peer requesting the radio telescope 335 can view the radio telescope 335 as a local resource.

Figure 4B:
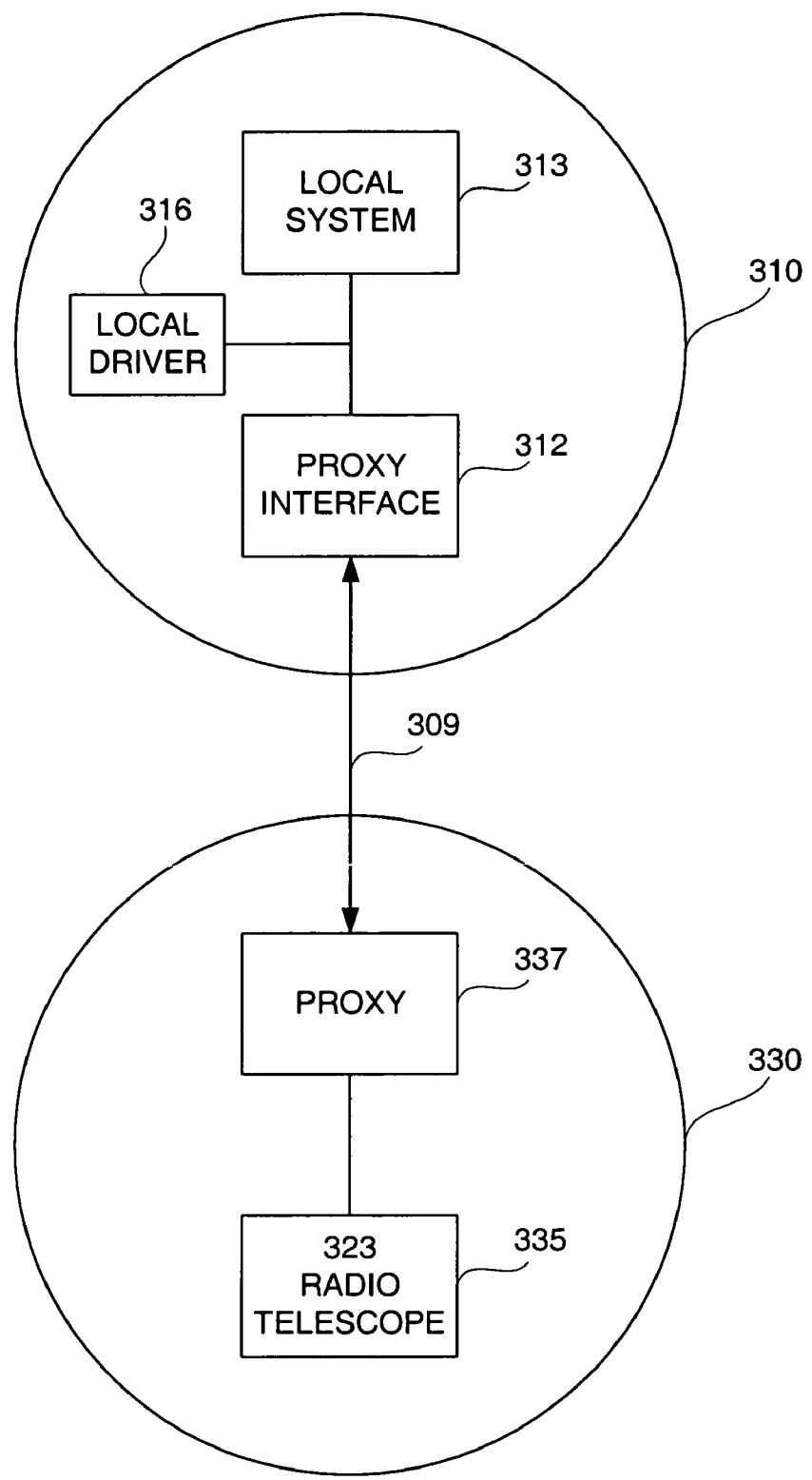
FIG. 4B is another diagram illustrating established communication between peers in a peer-to-peer network, in accordance with another embodiment of the invention.

In one embodiment of the peer-36 310 viewing the radio telescope 335 as a local resource, the peer-36 310 can use local software to manipulate the radio telescope 335. For example, FIG. 4B is another diagram illustrating established communication between peers in a peer-to-peer network, in accordance with another embodiment of the invention. Within the peer-36 310, the proxy interface 312 can receive command and control data from the local system 313 and a local driver 316. Local software, such as the local driver 316, can provide exemplary functions such as providing orientation data to the radio telescope 335. Such orientation data can include orienting the radio telescope 335 towards a particular location in the sky. However, any type of command and control data generated by local software is possible, as long as the peer generating the command and control data can view the resource managed by another peer as a local resource.

In an exemplary embodiment, the local driver 316 can operate in coordination with any software operating on the peer-5 330. However, in other embodiments, the local driver 316 can supplant any software operating on the peer-5 330. For example, if the peer-5 330 operates a radio telescope driver to operate the radio telescope 335, then the local driver 316 operating from the peer-36 310 can operate the radio telescope 335 in place of the radio telescope driver. Thus, software local to the peer requesting access to the resource can completely supplant any software operating the requested resource, as long as proxy services provide a means of communication between peers.

Figure 5:
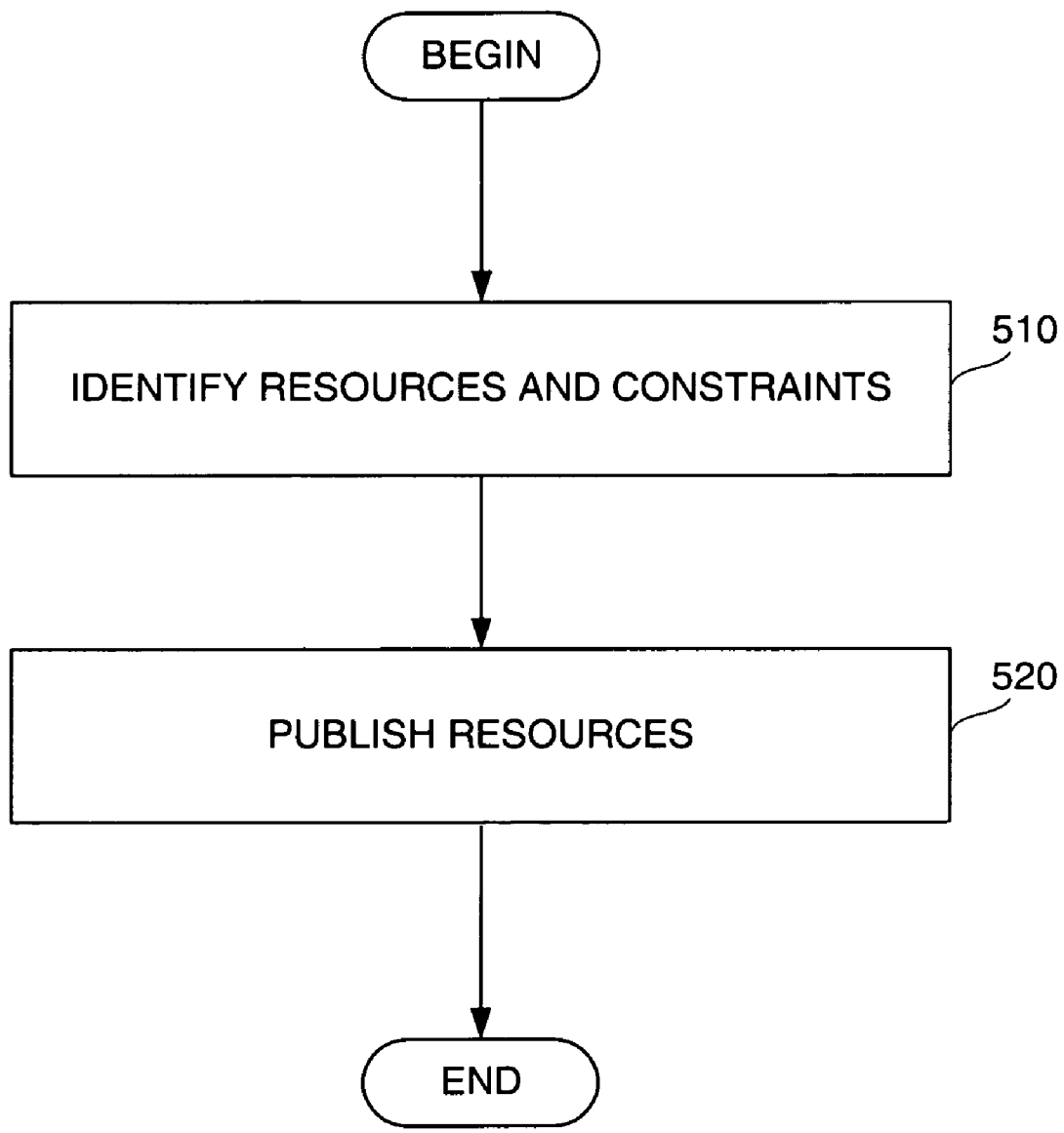
FIG. 5 is a flowchart diagram illustrating a method of providing resources in a peer-to-peer network, in accordance with an embodiment of the invention.

FIG. 5 is a flowchart diagram illustrating a method of providing resources in a peer-to-peer network, in accordance with an embodiment of the invention. Operations to provide proxied access to arbitrary resources on the P2P network can include operations to assess resource constraints and publishing that the arbitrary resources are available for use. For example, in operation 510, the proxy 337 (FIG. 4B) can identify resources and constraints. Identifying the resource can include identifying the radio telescope 335 by associating the identifier 323 (FIG. 3) with the radio telescope 335. Further, the constraints for using the resource can include the duration of use and permitted access. Thus, the radio telescope 335 may have constraints of permitting use only during set hours of a 24-hour period and may only permit access by peers located only from certain geographic regions on Earth.

Other exemplary constraints vary depending on the physical component to be accessed. For example, an image capture device may have a constraint of limiting the resolution to about 640×480 resolution for one class of peers requesting access. However, another class of peers can access the image capture device with about 1280×768 resolution. Another physical component, such as a processor, can have a constraint of permitting access during periods of inactivity. Alternatively, the processor may permit access for peers operating particular software, such as a video game. Thus, a constraint for the processor may not be the same constraint for the image capture device. To one of ordinary skill in the art, any constraint is possible, as long as the constraint is identified for a particular physical component. Further, in other embodiments, any means of identifying resources and constraints is possible, as long as the resource of a peer can be associated with a value that can be published on a resource list located anywhere in the P2P network.

After identifying the resource and any constraints of the resource, in operation 520, the peer managing the resource publishes the resource. For example, the peer-5 330 can publish the identifier 323 on the resource list 365. Of course, to one of ordinary skill in the art, any operation to publish resources is possible, as long as any peer looking for a resource can repeatedly find the resource after publication. Subsequently, the operations end.

Figure 6A:
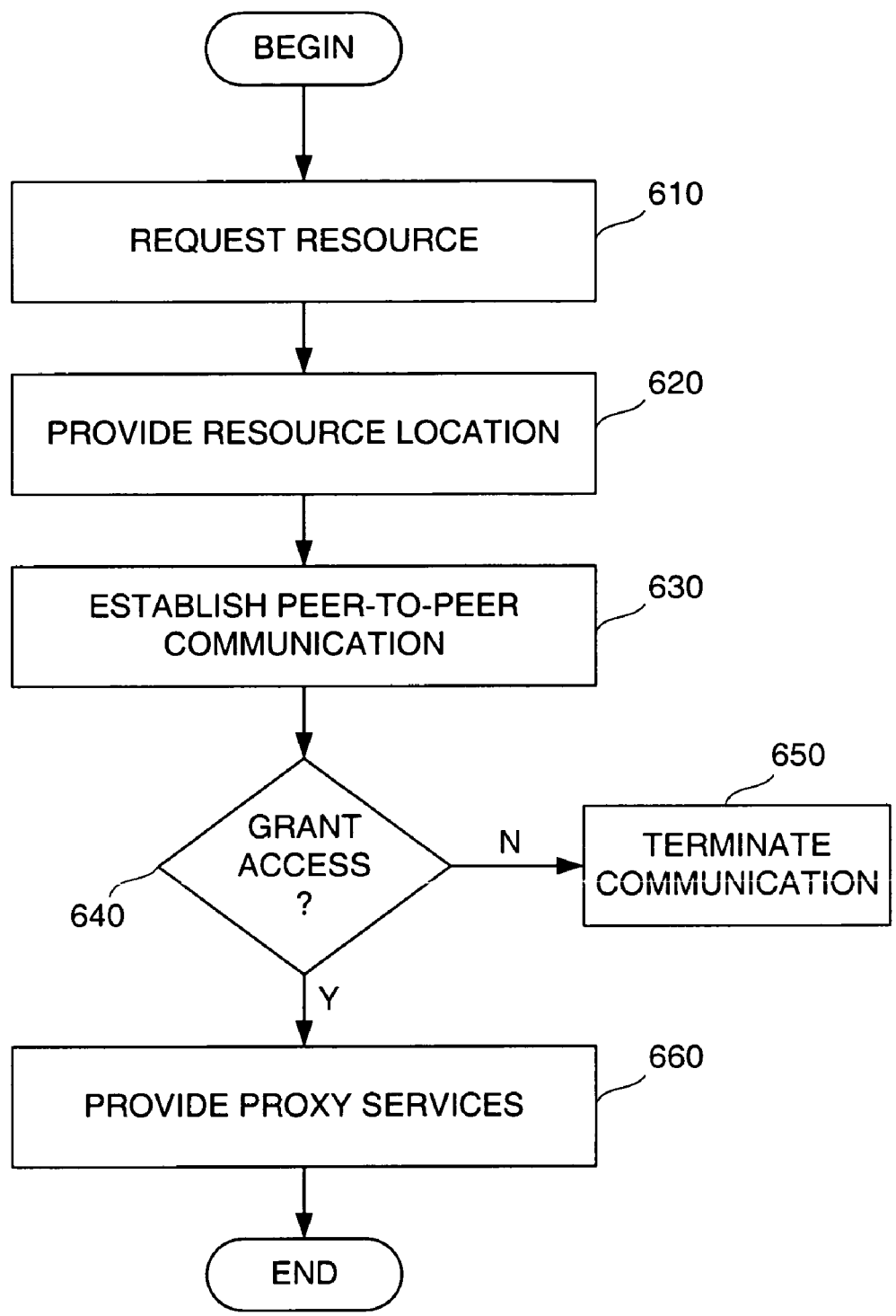
FIG. 6A is a flowchart diagram illustrating a method of establishing peer-to-peer communication, in accordance with an embodiment of the invention.

Thus, after a peer identifies the location of resource managed by another peer, the peer attempts to establish communication. For example, FIG. 6A is a flowchart diagram illustrating a method of establishing peer-to-peer communication, in accordance with an embodiment of the invention. Referring to the exemplary P2P network of FIG. 3, the peer-36 310 can request access to a resource such as the radio telescope 335, in operation 610. Then, in operation 620, after receiving the request, the peer-500 360 can provide the resource location. By using the resource list 365, the peer-500 360 can identify the peer-5 330 as managing the radio telescope 335.

In operation 630, the peer-36 310 establishes peer-to-peer communication with the peer-5 330. For example, establishing communication can occur by transmitting and receiving signals over the bi-directional communication link 309 (FIG. 4A). Then, in operation 640, the peer-5 330 determines whether to grant access to the radio telescope 335. If access is denied, then in operation 650, the peer-5 330 terminates communication with the peer-36 310. Alternatively, if the peer-5 330 grants access, then in operation 660, the peer-5 330 provides proxy services.

Providing proxy services via the proxy 337 (FIG. 4A) can include establishing the proxy interface 312 on the peer-36 310. Through the proxy interface 312, the peer-36 310 can transmit command and control signals over the bi-directional communication link 309 to control the radio telescope 335. The proxy 337 receives the command and control data and communicates with the radio telescope 335. Further, the proxy 337 can also arbitrate for the use of the radio telescope 335 with multiple requesting peers.

Thus, the peer-5 330 provides a virtualized interface to the peer-36 310 via the proxy interface 312, thereby permitting the peer-36 310 to believe it has control of the resource. Specifically, the peer-36 310 believes that there is a direct connection to the radio telescope 335 rather than the reality of the peer-36 310 going through the proxy interface 312. Accordingly, the proxy services provided by the proxy 337 enables virtualized access to system resources in a distributed decentralized environment. After providing proxy services and the termination of access to the radio telescope 335, the operations end.

Figure 6B:
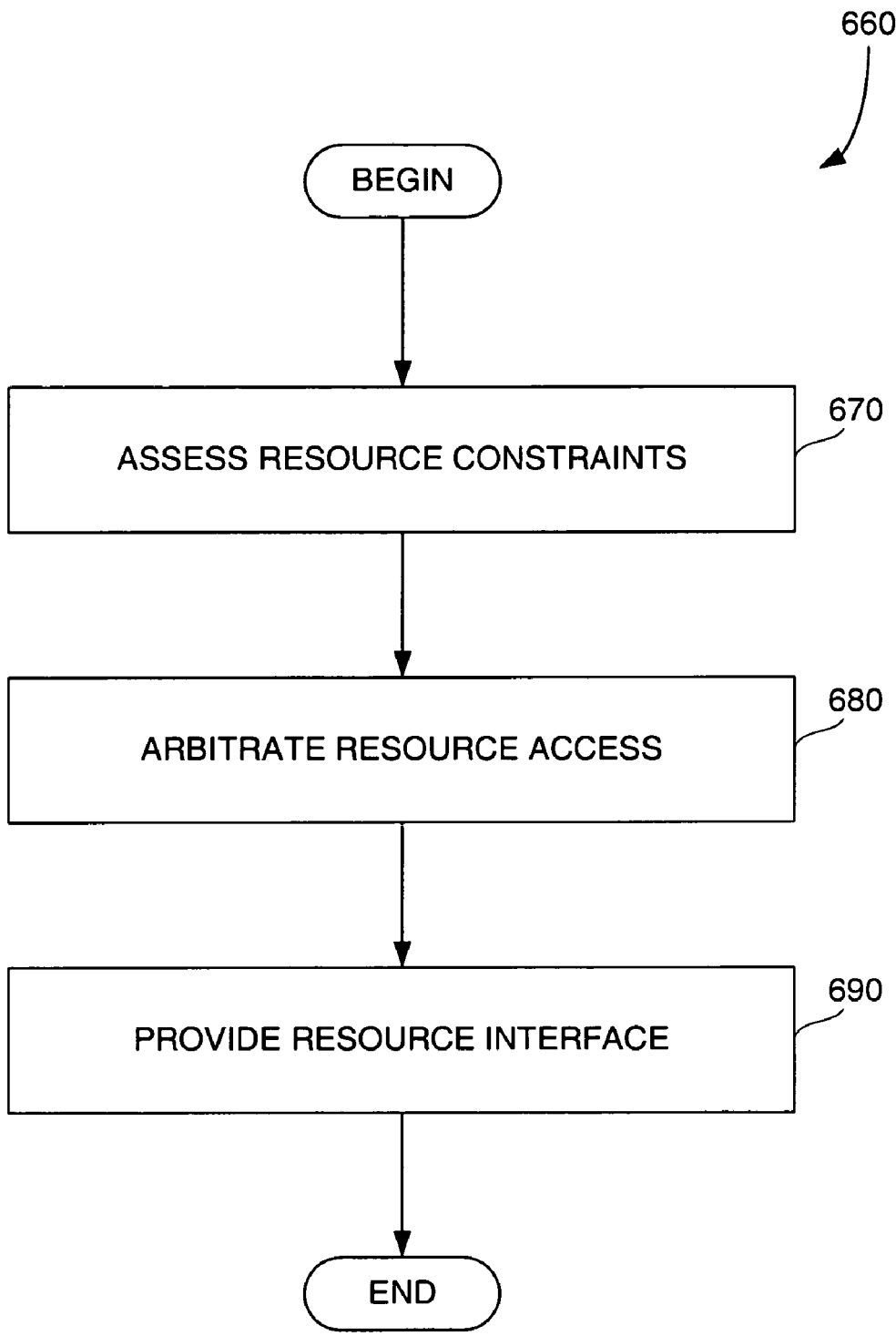
FIG. 6B is a flowchart diagram illustrating a method of providing proxy services, in accordance with an embodiment of the invention.

FIG. 6B is a flowchart diagram illustrating a method of providing proxy services, in accordance with an embodiment of the invention. In other embodiments, providing proxy services of operation 660 can include other operations. For example, in operation 670, the proxy 337 can assess resource constraints such as duration of use. Other exemplary constraints are possible. For example, a constraint may be to permit peers to access a DVD Read/Write (DVD-RW) drive for one of read access only, or read and write access. Another exemplary constraint can be to permit access to a security device, such as an alarm, only by a specific peer. For the alarm, the constraint may be governed by security concerns as to what peer can turn the alarm on and off. For the DVD-RW drive, the constraint may be governed by anti-piracy concerns and the protection of copyrights. Accordingly, any resource can have a plurality of different constraints unique to the operation of the resource.

Then, in operation 680, the proxy 337 can arbitrate resource access among multiple peers requesting access to the resource. Further, in operation 690, the proxy 337 can provide a resource interface such as the proxy interface 312. Thereafter, the operations end. Although FIG. 6B illustrates operations of the proxy 337, the proxy can include many other operations to permit virtualized access to resources managed by a peer. Further, the operations illustrated in FIGS. 5 through 6B are exemplary and indicate no particular order of executing the operations. For example, operations can be performed in parallel, thereby permitting access to resources from multiple peers.

Further, other exemplary embodiments including any structures are possible for establishing communication between a first peer and a second peer in the P2P network and defining parameters for accessing a resource of the first peer. The structure also permits the first peer to provide a proxy for managing access to the resource and enables access to the resource from the second peer through the proxy. The proxy also defines a proxy interface to enable the second peer to interact with the resource. Thus, any structure of a P2P network that enables virtualized access to resources distributed throughout the P2P network falls within the scope of the embodiments described herein.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for peers of a peer-to-peer network to access resources connected to particular peers of the peer-to-peer network, comprising:

establishing communication between a first peer and a second peer in the peer-to-peer network;

defining parameters for accessing a resource of the first peer, the resource being a physical resource, the first peer managing and publishing resources including setting up constraints for use of the resource by other peers in the peer-to-peer network, the resource constraints varying based on the resource, one or more constraints imposed at the resource, and resource requirements of the other peers, the resource constraints varying from peer to peer, the first peer providing a proxy for managing access to the resource, and the first peer configured to arbitrate accesses to the resource to define an order for accessing the resource among a plurality of peers desiring access to the resource; and receiving a request from a second peer to access the resource of the first peer;

if the first peer arbitrates access to the resource, enabling access to the resource in the order of accessing assigned to the second peer, such order determined among any of the plurality of peers also desiring access to the resource, the access to the resource being enabled through the proxy, the proxy defining a proxy interface to enable the second peer to interact with the resource, the proxy interface establishing the resource as a local resource to the second peer, wherein the use of the resource includes providing command and control to manage operation of the resource to the second peer through the proxy interface, the resources are hardware devices coupled to the particular peers, and providing the proxy for managing access to the resource further includes providing a bi-directional communication link.

2. A method of claim 1, wherein establishing communication further includes publishing the resource from the first peer to a third peer.

3. A method of claim 2, wherein publishing the resource further includes listing the resource as available on the first peer.

4. A method of claim 2, wherein publishing the resource further includes identifying the first peer to the second peer.

5. A method of claim 1, wherein the peer-to-peer network further includes connecting the first peer and the third peer in a grid.

6. A method of claim 1, wherein providing the proxy further includes assessing a resource constraint defining a level of access.

7. A method of claim 6, wherein assessing the resource constraint further includes determining a duration of access.

8. A method of claim 1, wherein providing the bi-directional communication link further includes establishing the proxy interface on the first peer to access the resource.

9. A method of claim 8, wherein establishing the proxy interface further includes providing command and control data via the proxy interface to manipulate the resource.

10. A method of claim 9, wherein providing command and control data further includes controlling the resource from the first peer.

11. A system for providing access to resources in a peer-to-peer distributed network, comprising:
- a first system and a second system capable of communication with one another over a peer-to-peer grid, the first and second systems part of a plurality of systems;
- a publication list accessible by the first system to identify the second system; and
- a resource of the second system being a physical resource, and the second system including a proxy for arbitrating access to the resource, the second system managing and publishing resources including setting up constraints for use of the resource by other peers in the peer-to-peer grid, the resource constraints varying based on the resource, one or more constraints imposed at the resource, and resource requirements of the first system and other systems in the plurality of systems of a peer-to-peer distributed network, the resource constraints varying from one peer to another, the publication list identifying the resource and location of the second system in the peer-to-peer grid to enable the first system to access the resource through a proxy interface, the proxy interface establishing the resource as a local resource to the first system, the access to the first system being in an order of access defined by the proxy among any other of the plurality of systems attempting access to the resource,
- wherein access to the resource includes providing command and control to manage operation of the resource to the first system through the proxy interface, the peer-to-peer grid is configured to provide a plurality of proxy interfaces to manipulate the resource, the resources are hardware devices coupled to the peers, and manipulation of the resource further includes command and control capabilities from the first system to the second system.

12. The system of claim 11, wherein command and control capabilities includes a control signal transmitted to the resource from a local system of the first system.

13. A non-transitory computer readable media including program instructions for peers of a peer-to-peer network to access resources connected to particular peers of the peer-to-peer network, the computer readable media comprising:
- program instructions for establishing communication between a first peer and a second peer in the peer-to-peer network;
- program instructions for defining parameters for accessing a resource of the first peer, the resource being a physical resource, the first peer managing and publishing resources including setting up constraints for use of the resource by other peers in the peer-to-peer network, the resource constraints varying based on the resource, one or more constraints imposed at the resource, and resource requirements of the other peers, the resource constraints varying from one peer to another, the first peer providing a proxy for managing access to the resource, and the first peer configured to arbitrate accesses to the resource to define an order for accessing the resource among a plurality of peers desiring access to the resource; and
- program instructions for receiving a request from a second peer to access the resource of the first peer;
- if the first peer arbitrates access to the resource,
  - program instructions for enabling access to the resource in the order of accessing assigned to the second peer, such order determined among any of the plurality of peers also desiring access to the resource, the access to the resource being enabled through the proxy, the proxy defining a proxy interface to enable the second peer to interact with the resource, the proxy interface establishing the resource as a local resource to the second peer,
  - wherein the use of the resource includes providing command and control to manage operation of the resource to the second peer through the proxy interface, the resources are hardware devices coupled to the particular peers, the proxy having a resource constraint defining a level of access and determining a duration of access, and establishing the proxy interface further includes providing command and control data via the proxy interface to manipulate the resource.

14. The non-transitory computer readable media of claim 13, wherein program instructions for establishing communication further includes program instructions for publishing the resource from the first peer to a third peer.

15. The non-transitory computer readable media of claim 14, wherein program instructions for publishing the resource further includes program instructions for listing the resource as available on the first peer.

16. The non-transitory computer readable media of claim 14, wherein program instructions for publishing the resource further includes program instructions for identifying the first peer to the second peer.

* * * * *